United States Patent
Prasad et al.

(10) Patent No.: US 11,537,542 B1
(45) Date of Patent: Dec. 27, 2022

(54) DIRECT MEMORY ACCESS CIRCUITRY AND METHOD

(71) Applicant: MARVELL ASIA PTE, LTD., Singapore (SG)

(72) Inventors: Syam Prasad, Hyderabad (IN); Amarnath Vishwakarma, Hyderabad (IN); Chidamber Kulkarni, Richmond (CA); Prasanna Sukumar, Pleasanton, CA (US)

(73) Assignee: MARVELL ASIA PTE LTD., Singapore (SG)

( * ) Notice: Subject to any disclaimer, the term of this patent is extended or adjusted under 35 U.S.C. 154(b) by 144 days.

(21) Appl. No.: 17/159,672

(22) Filed: Jan. 27, 2021

Related U.S. Application Data

(60) Provisional application No. 62/979,078, filed on Feb. 20, 2020.

(51) Int. Cl.
| | |
|---|---|
| G06F 13/28 | (2006.01) |
| G06F 13/16 | (2006.01) |
| G06F 9/30 | (2018.01) |
| G06F 9/50 | (2006.01) |
| G06F 13/42 | (2006.01) |

(52) U.S. Cl.
CPC .......... *G06F 13/28* (2013.01); *G06F 9/30105* (2013.01); *G06F 9/5016* (2013.01); *G06F 13/1673* (2013.01); *G06F 13/4221* (2013.01)

(58) Field of Classification Search
CPC ............... G06F 9/30105; G06F 9/5016; G06F 13/1673; G06F 13/28; G06F 13/4221
See application file for complete search history.

(56) References Cited

U.S. PATENT DOCUMENTS 10,481,827 B2 * 11/2019 Duncan .................. G06F 13/28
10,761,999 B1 * 9/2020 Harari Shechter ... H04L 9/0897

OTHER PUBLICATIONS

Y. Chen, Y. Wang, Y. Ha, M. R. Felipe, S. Ren and K. M. M. Aung, "sAES: A high throughput and low latency secure cloud storage with pipelined DMA based PCIe interface," 2013 International Conference on Field-Programmable Technology (FPT), 2013, pp. 374-377, doi: 10.1109/FPT.2013.6718391. (Year: 2013).*

* cited by examiner

*Primary Examiner* — Eric T Oberly

(57) ABSTRACT

Disclosed approaches eliminate involving a bus interface in polling by the host computer system and the peripheral component for events to coordinate direct memory access (DMA) transfers. The host polls main memory for DMA events communicated by the peripheral component, and the peripheral component polls local registers for DMA addresses to initiate DMA transfers. DMA transfers are initiated by the host storing main memory addresses in the local registers of the peripheral component, and DMA events generated by the peripheral component are stored in the main memory.

14 Claims, 3 Drawing Sheets

DIRECT MEMORY ACCESS CIRCUITRY AND METHOD

FIELD OF THE INVENTION

One or more embodiments generally relate to direct memory access (DMA) circuits and methods.

BACKGROUND

Direct memory access (DMA) supports transfer of data between the main memory of a computer system and a component coupled to the main memory via a bus interface, such as the peripheral component interconnect express (PCIe) interface, while allowing the central processing unit (CPU) of the computer system to perform other tasks. Examples of peripheral components include, without limitation, graphics cards, retentive storage devices (hard disk drives and solid state drives), hardware accelerators, etc.

The CPU and peripheral component communicate events over the interface to coordinate DMA transfers. In some approaches, the communication of events involves the CPU polling registers of the peripheral component. In other approaches the communication of events involves the peripheral component polling the main memory. Polling for events over the interface can compete for interface bandwidth with the transfers of data. Thus, at some level polling for events can increase latency and decrease DMA throughput.

SUMMARY

A disclosed circuit arrangement includes a memory circuit, a memory controller coupled to the memory circuit, a host interface circuit, a register, and a direct memory access circuit. The memory circuit is configured to provide read and write access to the memory circuit, and the host interface circuit configured to be coupled to a host computer system. The register is configured for storage of a first buffer address in main memory of the host computer system. The direct memory access circuit is coupled to the host interface circuit, the memory controller, and the first register. The direct memory access circuit is configured to poll the first register for presence of the first buffer address from which to transfer data from the main memory of the host computer system. The direct memory access circuit is configured to initiate with the host interface circuit, in response to presence of the first buffer address, a first transfer of first data from the first buffer address to the memory circuit. The direct memory access circuit is configured to initiate with the host interface circuit, in response to completion of the first transfer, a write to the main memory of the host computer system of first event data that indicate completion of the first transfer.

A disclosed method includes providing read and write access to data in a memory circuit of an accelerator platform via an accelerator memory controller. The method includes a direct memory access (DMA) circuit of the accelerator platform polling a first register of the accelerator platform for presence of a first buffer address of main memory of a host computer system from which to transfer data. The method includes the DMA circuit initiating with a host interface circuit of the accelerator platform, in response to presence of the first buffer address, a first transfer of first data from the first buffer address to the memory circuit of the accelerator platform. The method includes the DMA circuit initiating with the host interface circuit, in response to completion of the first transfer, a write to the main memory of the host computer system of first event data that indicates completion of the first transfer.

A disclosed system includes a processor arrangement and a main memory coupled to the processor arrangement. The main memory is configured with instructions that when executed by the processor arrangement cause the processor arrangement to perform operations of egress and ingress direct memory access (DMA) processing. For egress DMA processing the processor arrangement allocates a first buffer in the main memory for egress direct memory access (DMA), and writes egress data to the first buffer. For egress processing, the processor arrangement also initiates a write of a main memory address of the first buffer to a first register of a peripheral component in response to completion of writing the egress data to the first buffer. For ingress DMA processing, the processor arrangement allocates a second buffer in the main memory for ingress DMA, and initiates a write of a main memory address of the second buffer to a second register of the peripheral component. For ingress DMA processing, the processor arrangement also polls in the main memory, for ingress event data that indicate completion of a transfer of ingress data to the second buffer, reads the ingress data from the second buffer in response to presence of the ingress event data, and clears the ingress event data from the main memory after reading the ingress data.

Another disclosed method includes for egress direct memory access (DMA) processing, allocating a first buffer in main memory of a host computer system by a processor arrangement of the host computer system for egress DMA, writing egress data to the first buffer, and initiating a write of a main memory address of the first buffer to a first register of peripheral component in response to completion of writing the egress data to the first buffer. For ingress DMA processing, the method includes allocating a second buffer in the main memory for ingress DMA, initiating a write of a main memory address of the second buffer to a second register of the peripheral component, polling for ingress event data in the main memory indicating completion of a transfer of ingress data to the second buffer, reading the ingress data from the second buffer in response to presence of the ingress event data, and clearing the ingress event data from the main memory after reading the ingress data.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings in which.

DETAILED DESCRIPTION

Figure 1:
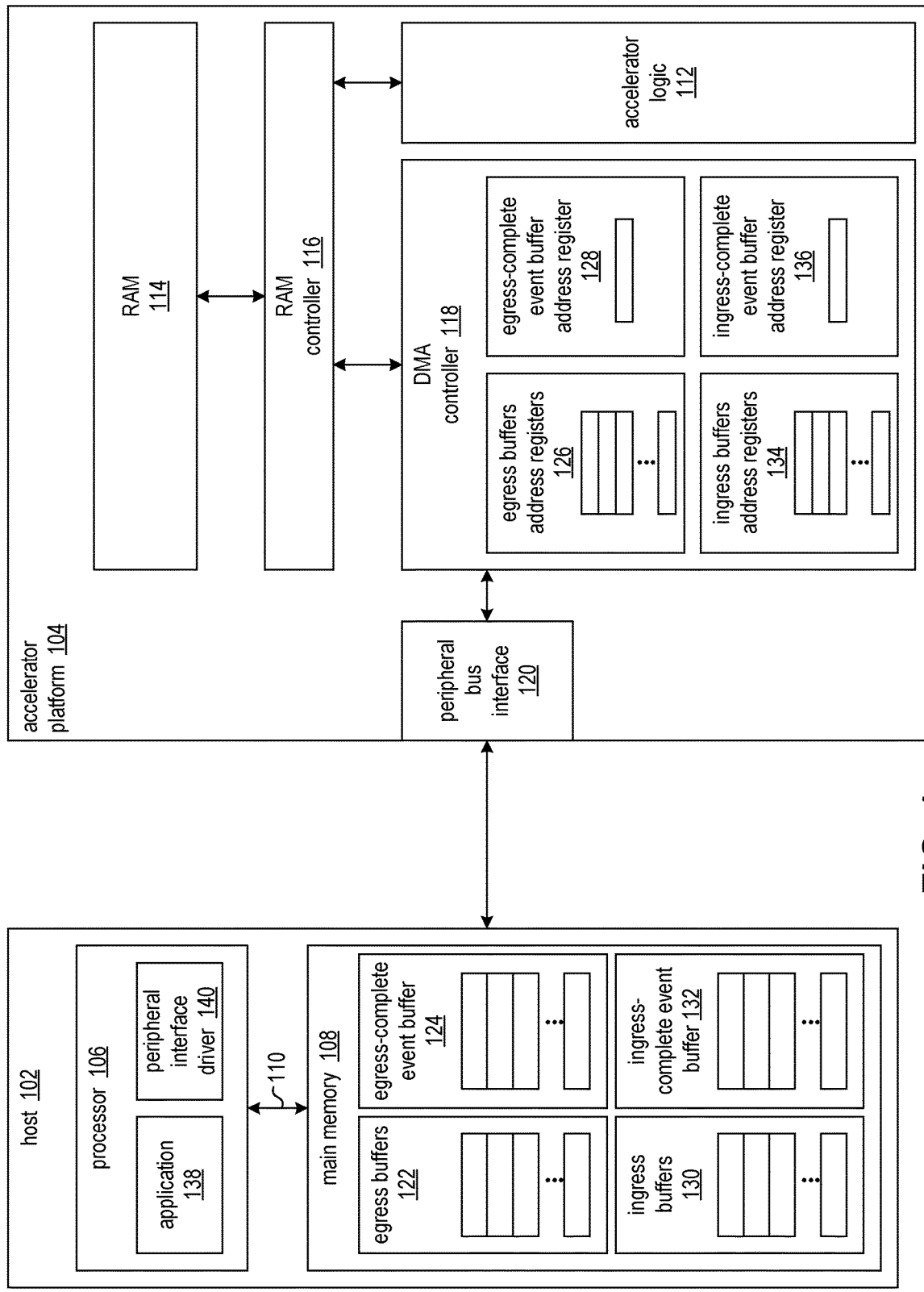
FIG. 1 shows a system having circuitry that can implement approaches for improving direct memory access (DMA)

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches eliminate involving the bus interface in polling by the host computer system and the peripheral component for events to coordinate DMA transfers. The host polls main memory for DMA events communicated by the peripheral component, and the peripheral component polls local registers for DMA addresses to initiate DMA transfers. DMA transfers are initiated by the host storing main memory addresses in the local registers of the peripheral component, and DMA events generated by the peripheral component are stored in the main memory.

In further aspects, the disclosed approaches provide multiple egress buffers in the main memory for DMA transfers from the main memory to the peripheral component and multiple ingress buffers in the main memory for DMA transfers from the peripheral component to the main memory.

Egress-complete and ingress-complete event buffers are stored in the main memory. The egress-complete buffer can have entries associated with the egress buffers, and the ingress-complete buffer can have entries associated with the ingress buffers. The peripheral component writes event data to an entry in the egress-complete buffer when the DMA transfer from the associated egress buffer to the peripheral component is complete, and the associated egress buffer can be used for another DMA transfer. The peripheral component writes event data to an entry in the ingress-complete buffer when the DMA transfer from the peripheral device to the associated ingress buffer is complete, and the CPU can read and process the data from the ingress buffer.

FIG. 1 shows a system having circuitry that can implement approaches for improving direct memory access (DMA). The system generally includes a host computer system 102 and an accelerator platform 104. Though an accelerator platform is illustrated, it will be appreciated that the disclosed approaches can be deployed in other types of peripheral components, such as data storage devices.

The host computer system 102 generally includes a processor arrangement 106 that is coupled to a main memory 108. The processor arrangement can be a stand-alone CPU, a graphics processing unit (GPU), a reduced instruction set CPU (RISC), or a multi-core processor, for example. The processor arrangement can be coupled to the main memory via a system bus 110, which is also sometimes referred to as a memory bus or host bus. The host computer system can include additional circuitry (not shown), such as a cache subsystem and input/output (I/O) channels and circuitry for user I/O devices, local and wide area network connections, data storage, etc.

The accelerator platform 104 can include accelerator logic 112, RAM 114, a RAM controller 116, and a DMA controller 118 that is coupled to the host via a peripheral bus interface 120. Though not shown, it will be understood that the peripheral bus interface can connect to the system bus 110 through a host adapter (not shown). Though not shown, the accelerator platform can have additional I/O channels and circuitry for communicating with other devices and/or networks.

The accelerator logic 112 can be application-specific. For example, the accelerator logic can offload certain arithmetic functions, such as multiply and accumulate, from the host processor. Other applications can involve performing encryption and/or decryption operations, for example. In some implementations, the accelerator logic can be implemented in programmable logic circuitry of the accelerator platform. Field programmable gate array circuitry is an example of programmable logic circuitry.

The peripheral bus interface 120 communicatively couples the DMA controller 118 of the accelerator platform 104 to the system bus 110 and main memory 108 of the host computer system 102. In an exemplary implementation, the peripheral bus interface can be a peripheral component interconnect express (PCIe) interface or any other interface suitable for application objectives.

Buffers are allocated in the main memory 108 of the host computer system 102 for transfer of data and for indicating to the host when transfers are complete. The DMA controller 118, which is a component of the accelerator platform 104, includes sets of registers for managing data transfers. The sets of registers store addresses of corresponding ones of the buffers in the main memory of the host. Egress data transfers are managed through the egress buffers 122 and egress-complete event buffer 124 in host memory 108, and the egress buffers address registers 126 and egress-complete event buffer address register 128 in the DMA controller 118. Ingress data transfers are managed through the ingress buffers 130 and ingress-complete event buffer 132 in host memory, and the ingress buffers address registers 134 and ingress-complete event buffer address register 136 in the DMA controller.

At system start-up or initialization, the DMA controller 108 stores data in the egress-complete event buffer 124 to indicate all the egress buffers 122 are available for use by the software application 138 for data transfer. In response to the application having data to be transferred to the accelerator platform, the software application calls the peripheral interface driver 140, which polls the egress-complete event buffer to identify an egress buffer that is available. The software application through the peripheral interface driver then writes the data to be transferred into the identified one of the egress buffers 122. Once the egress data has been written, the peripheral interface driver writes the main memory address of that egress buffer into an associated one of the egress buffers address registers 126 of the DMA controller, and writes the number of bytes written to a register (not shown) associated with the address register. In response to an address and the number of bytes being greater than 0, the DMA controller initiates a read of the egress data from the referenced egress buffer. In response to completing the egress data transfer from the egress buffer, the DMA controller 118 updates the corresponding entry in the egress-complete event buffer 124 with the egress buffer number to indicate that the data has been transferred to the accelerator platform and that the egress buffer is again available.

To support DMA transfers of data from the accelerator platform 104 to main memory 108, the software application 138 through the peripheral interface driver 140 allocates a portion of host memory 108 for multiple ingress buffers 130. The peripheral interface driver communicates the addresses of the ingress buffers by writing the address to the ingress buffers address registers 134 in the DMA controller 118 through the peripheral bus interface 120. The peripheral interface driver 140 also allocates an ingress-complete event buffer 132 in main memory of the host for events communicated by the DMA controller. The peripheral interface driver writes the address of the ingress-complete event buffer to the ingress-complete event buffer address register 136 of the DMA controller. The registers in the DMA controller can be stand-alone registers or bytes/words of an addressable storage circuit, depending on implementation requirements.

When the accelerator platform has data to be transferred to the host, the DMA controller 118 identifies an ingress buffer that is available based on availability indicators in the ingress buffers address registers 134. Each one of the ingress buffers address registers can store a host memory address, an ingress buffer number that identifies the ingress buffer, and data that indicate whether or not the ingress buffer is available. The DMA controller reads the address from the ingress buffers address register and writes data into the ingress buffer referenced by that address. Once the data has been written, the DMA controller communicates the ingress buffer number into which the ingress data was written along the number of bytes written by writing the event data to the associated entry in the ingress-complete event buffer 132, which is referenced by the address in the ingress-complete event buffer address register 136. The peripheral interface driver 140 polls the entries in the ingress complete event buffer and determines whether or not new event data has been written. In response to finding new event data in an entry in the ingress complete event buffer, the software application reads the ingress data from the ingress buffer identified in the event data. Once the ingress data has been read from the identified ingress buffer, the peripheral interface driver clears the event data from the entry in the ingress-complete event buffer and updates the associated ingress buffer address register with the data buffer number to indicate that the data has been read, and the ingress buffer is again available for use.

With the disclosed approach, the peripheral interface driver 140 polls for events in the host memory and the DMA controller 118 polls for events in the registers of the DMA controller on the accelerator platform. As the polling is not performed via the peripheral bus interface, most of the bandwidth of peripheral bus interface is available for the data transfer.

Figure 2:
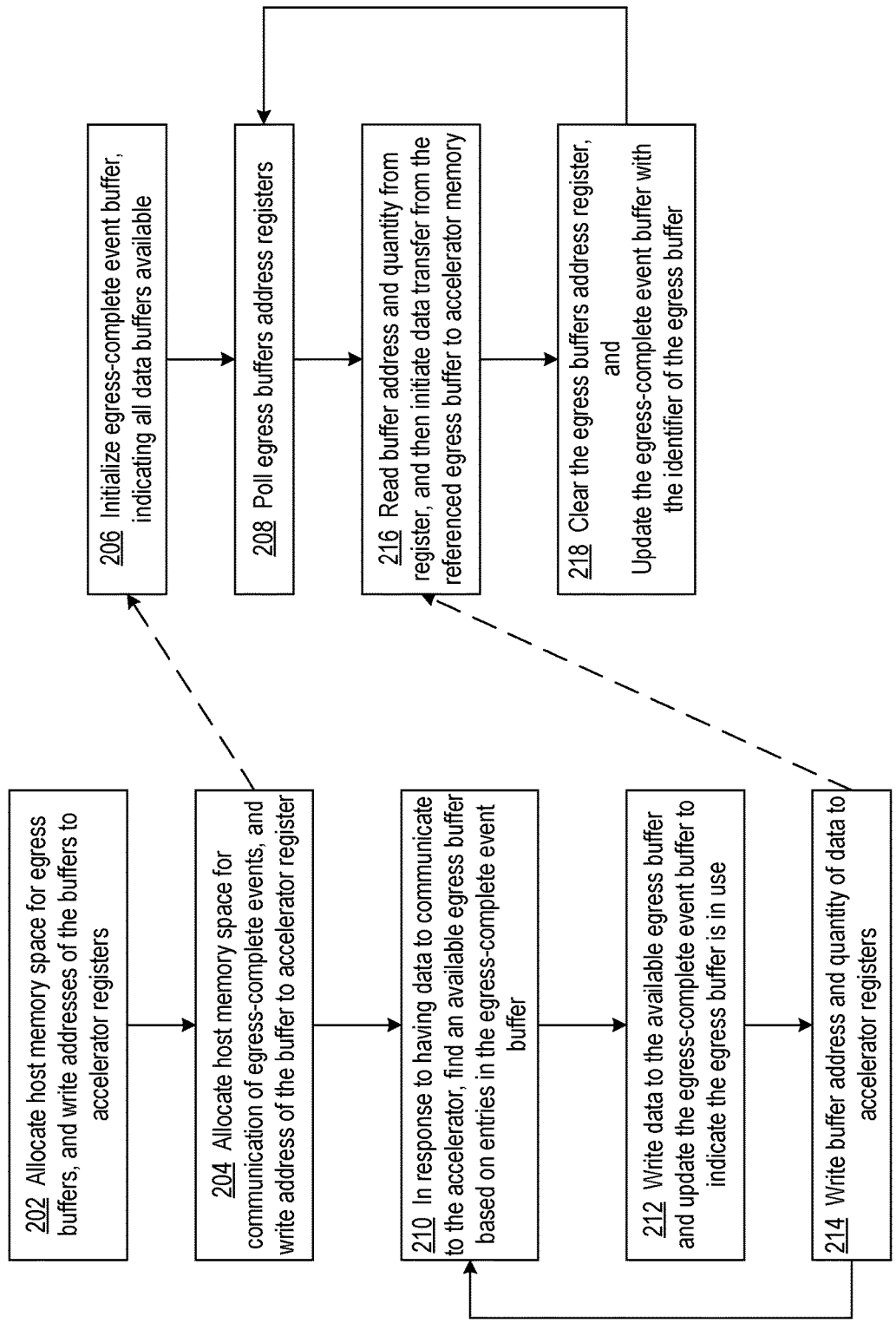
FIG. 2 shows a flowchart of an exemplary process of DMA data transfer from host memory to an accelerator platform.

FIG. 2 shows a flowchart of an exemplary process of DMA data transfer from host memory to an accelerator platform. At block 202, the host data processing system allocates space in main memory for egress buffers, and writes addresses of the egress buffers to associated egress buffer address registers in the DMA controller of the accelerator platform. At block 204, the host data processing system allocates space in main memory for the egress-complete events buffer, and writes the address of the egress-complete events buffer to the egress-complete events buffer address register in the DMA controller.

The DMA controller at block 206, in response to having the address of the egress-complete events buffer, initializes entries in the buffer to indicate all the egress buffers are initially available. The DMA controller can then begin polling the egress buffer address registers for data, such as an address and a non-zero value indicating a quantity of data to transfer, that indicate the presence of data to transfer in the egress buffers in host memory.

At block 210 when software executing on the host has data to communicate to the accelerator platform, the software determines which one of the egress buffers is available based on entries in the egress-complete event buffer. The software writes data to the identified egress buffer at block 212 and updates the associated entry in the egress-complete event buffer to indicate that the egress buffer is in-use. At block 214, the host software writes information, such as a buffer address and a value indicating a quantity of data, to one of the egress buffers address registers in the DMA controller to signal to the DMA controller that the egress buffer has data to transfer. After data have been written to the egress buffers address register at block 214, the host returns to block 210 to wait for more data to be transferred, and in response there to initiate an egress transfer.

The DMA controller, in response to finding an egress buffer address register indicates data to be transferred, at block 216 reads the egress buffer address and quantity value from the register and initiates data transfer from the referenced egress buffer in host memory to accelerator memory. At block 218, the DMA controller in response to completing the transfer of data from host memory to accelerator memory, clears information from the egress buffer address register to indicate no egress data is available for transfer in the egress buffer, and also writes event data, such as an egress buffer number, to an entry in the egress-complete event buffer to indicate to the host that the egress buffer is no longer in use and is available. After indicator data have been cleared from the egress buffers address register and the entry in the egress-complete buffer has been updated, the DMA controller returns to block 208 to poll for an indication that more data is ready to be transferred.

Figure 3:
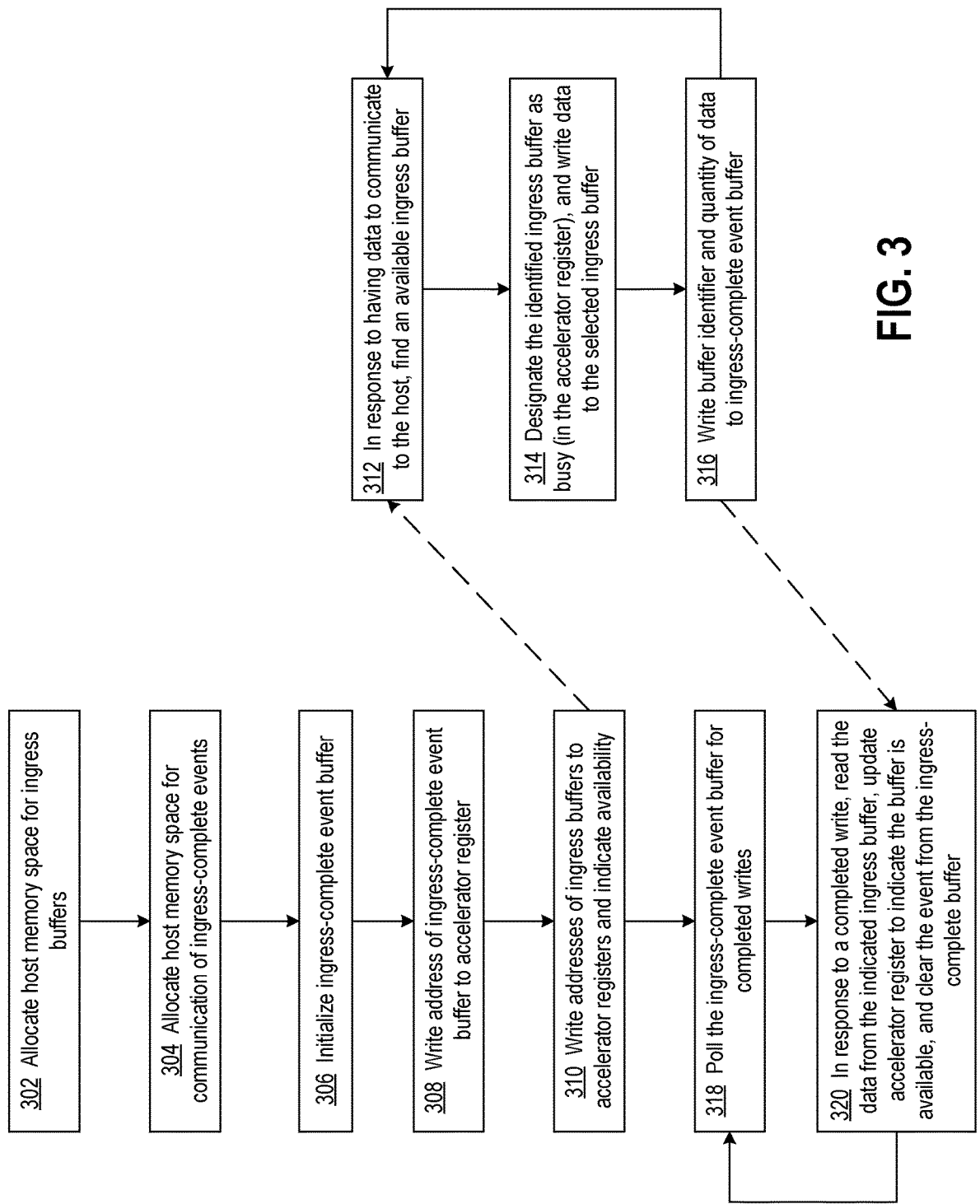
FIG. 3 shows a flowchart of an exemplary process of DMA data transfer from an accelerator platform to host memory.

FIG. 3 shows a flowchart of an exemplary process of DMA data transfer from an accelerator platform to host memory. At block 302, the host data processing system allocates space in main memory for ingress buffers, and at block 304 the host data processing system allocates space in main memory for an ingress-complete event buffer. The host data processing system at block 306 initializes the entries in the ingress-complete event buffer to indicate that none of the ingress buffers have ingress data to be processed. At block 308, the host writes the address of the ingress-complete event buffer to the ingress-complete event buffer address register in the DMA controller. The host at block 310 writes addresses of the ingress buffers to the ingress buffers address registers in the DMA controller, along with writing information to the registers to indicate that all of the ingress buffers are initially available for use.

In response to the accelerator platform having data to transfer to the host memory, at block 312 the DMA controller finds an available one of the ingress buffers in the host memory. The DMA controller can identify an available ingress buffer based on availability indicator data in the local ingress buffers address registers. Once an available ingress buffer has been identified, at block 314 the DMA controller designates the identified ingress buffer as busy by updating the availability indicator data in the identified one of the local ingress buffers address registers. The DMA controller also writes the ingress data to the ingress buffer in main memory as addressed by the identified one of the local ingress buffers address registers. Once the ingress data have been written to the ingress buffer, at block 316 the DMA controller writes event data, which can include the ingress buffer number that identifies the ingress buffer to the host and a value indicating the quantity of data, to the ingress-complete event buffer. The DMA controller then returns to block 312 to wait for more data to be transferred, and in response there to initiate an ingress transfer.

At block 318, the host data processing system polls the ingress-complete event buffer for an entry that includes a buffer number that identifies an ingress buffer to which the transfer of ingress data is complete. In response to finding a completed transfer to an ingress buffer, at block 320 the host reads the data from the referenced ingress buffer and updates the associated ingress buffers address register with indicator data that designates the ingress buffer as being available. The host also clears the event data from the entry in the ingress-complete event buffer. After data have been updated in the accelerator register and the ingress-complete event buffer, the host returns to block 318 to poll for an indication that more data have been transferred.

Various logic may be implemented as circuitry to carry out one or more of the operations and activities described herein and/or shown in the figures. In these contexts, the circuits may be referred to as "logic," "module," "engine," "adapter," "controller," "component," "interface," "platform," or "block." It should be understood that the different terms used to reference the implemented logic are all circuits that carry out one or more of the operations/activities. For example, in certain of the above-discussed implementations, one or more controllers are discrete logic circuits or programmable logic circuits configured and arranged for implementing these operations/activities. In certain implementations, a programmable circuit is one or more computer circuits programmed to execute a set (or sets) of instructions (and/or configuration data). The instructions (and/or configuration data) can be in the form of firmware or software stored in and accessible from a memory (circuit).

Though aspects and features may in some cases be described in individual figures, it will be appreciated that features from one figure can be combined with features of another figure even though the combination is not explicitly shown or explicitly described as a combination.

The embodiments are thought to be applicable to a variety of peripheral devices and DMA controllers. Other aspects and embodiments will be apparent to those skilled in the art from consideration of the specification. The embodiments may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A circuit arrangement, comprising:
   a memory circuit;
   a memory controller coupled to the memory circuit and configured to provide read and write access to the memory circuit;
   a host interface circuit configured to be coupled to a host computer system;
   a first register configured for storage of a first buffer address in main memory of the host computer system;
   a direct memory access circuit coupled to the host interface circuit, the memory controller, and the first register, wherein the direct memory access circuit is configured to:
      poll the first register for presence of the first buffer address from which to transfer data from the main memory of the host computer system;
      initiate with the host interface circuit in response to presence of the first buffer address, a first transfer of first data from the first buffer address to the memory circuit; and
      initiate with the host interface circuit in response to completion of the first transfer, a write of first event data to the main memory of the host computer system indicating completion of the first transfer.

2. The circuit arrangement of claim 1, further comprising:
   a second register configured for storage of an event buffer address of the main memory; and
   wherein the direct memory access circuit is configured to initiate the write of the first event data to the event buffer address.

3. The circuit arrangement of claim 1, further comprising:
   a second register configured for storage of a second buffer address in the main memory of the host computer system;
   wherein the direct memory access circuit is configured to:
      determine from the second register if the second buffer address is available;
      initiate with the host interface circuit in response to the second buffer address being available, a second transfer of data from the memory circuit to the main memory at the second buffer address; and
      initiate with the host interface circuit in response to completion of the second transfer, a write to the main memory of the host computer system of second event data that indicate completion of the second transfer.

4. The circuit arrangement of claim 3, further comprising:
   a third register configured for storage of a first event buffer address of the main memory;
   wherein the direct memory access circuit is configured to initiate the write of the first event data to the first event buffer address;
   a fourth register configured for storage of a second event buffer address of the main memory; and
   wherein the direct memory access circuit is configured to initiate the write of the second event data to the second event buffer address.

5. The circuit arrangement of claim 1, further comprising:
   programmable logic circuitry coupled to the memory controller; and
   an application circuit implemented in the programmable logic circuitry and configured to process the first data in response to completion of the first transfer.

6. A method, comprising:
   providing read and write access to data in a memory circuit of an accelerator platform via an accelerator memory controller;
   polling by a direct memory access (DMA) circuit of the accelerator platform, a first register of the accelerator platform for presence of a first buffer address of main memory of a host computer system from which to transfer data;
   initiating by the DMA circuit with a host interface circuit of the accelerator platform, in response to presence of the first buffer address, a first transfer of first data from the first buffer address to the memory circuit of the accelerator platform; and
   initiating by the DMA circuit with the host interface circuit, in response to completion of the first transfer, a write to the main memory of the host computer system of first event data that indicates completion of the first transfer.

7. The method of claim 6, further comprising:
   storing by the DMA circuit, an event buffer address of the main memory in a second register on the accelerator platform; and
   initiating the write of the first event data to the event buffer address in the main memory of the host computer system by the DMA circuit.

8. The method of claim 6, further comprising:
   storing by the DMA circuit, a second buffer address of the main memory of the host computer system in a second register on the accelerator platform;
   determining by the DMA circuit from the second register if the second buffer address is available;

initiating by the DMA circuit with the host interface circuit in response to the second buffer address being available, a second transfer of data from the memory circuit to the main memory at the second buffer address; and initiating by the DMA circuit with the host interface circuit in response to completion of the second transfer, a write of second event data to the main memory of the host computer system indicating completion of the second transfer.

9. The method of claim 8, further comprising:

storing by the DMA circuit, a first event buffer address of the main memory in a third register on the accelerator platform;

initiating by the DMA circuit the write of the first event data to the first event buffer address;

storing by the DMA circuit, a second event buffer address of the main memory in a fourth register of the accelerator platform; and initiating by the DMA circuit the write of the second event data to the second event buffer address.

10. The method of claim 6, further comprising processing the first data by an application circuit implemented in programmable logic circuitry of the accelerator platform in response to completion of the first transfer.

11. A system, comprising:

a processor arrangement;

a main memory coupled to the processor arrangement, wherein the main memory is configured with instructions that when executed by the processor arrangement cause the processor arrangement to perform operations including:

for egress direct memory access (DMA) processing:
  allocating a first buffer in the main memory for egress DMA,
  writing egress data to the first buffer, and
  initiating a write of a main memory address of the first buffer to a first register of a peripheral component in response to completion of writing the egress data to the first buffer; and for ingress DMA processing:
  allocating a second buffer in the main memory for ingress DMA,
  initiating a write of a main memory address of the second buffer to a second register of the peripheral component;
  polling in the main memory, for ingress event data that indicate completion of a transfer of ingress data to the second buffer,
  reading the ingress data from the second buffer in response to presence of the ingress event data, and
  clearing the ingress event data from the main memory after reading the ingress data.

12. The system of claim 11, wherein the main memory is configured with instructions that when executed by the processor arrangement, cause the processor arrangement to perform operations including:

for egress processing:
  allocating a third buffer in the main memory for storage of egress event data,
  initiating a write of a main memory address of the third buffer to a third register of the peripheral component, and
  writing the egress data to the first buffer in response to the egress event data indicating the first buffer is available; and for ingress processing:
  allocating a fourth buffer in the main memory for storage of the ingress event data,
  initiating a write of a main memory address of the fourth buffer to a fourth register of the peripheral component, and
  wherein the polling for ingress event data includes polling the fourth buffer for the ingress event data.

13. A method, comprising:

for egress direct memory access (DMA) processing:
  allocating a first buffer in main memory of a host computer system by a processor arrangement of the host computer system for egress DMA,
  writing egress data to the first buffer, and
  initiating a write of a main memory address of the first buffer to a first register of peripheral component in response to completion of writing the egress data to the first buffer; and for ingress DMA processing:
  allocating a second buffer in the main memory for ingress DMA,
  initiating a write of a main memory address of the second buffer to a second register of the peripheral component,
  polling for ingress event data in the main memory indicating completion of a transfer of ingress data to the second buffer,
  reading the ingress data from the second buffer in response to presence of the ingress event data, and
  clearing the ingress event data from the main memory after reading the ingress data.

14. The method of claim 13, further comprising:

for egress processing:
  allocating by the processor arrangement, a third buffer in the main memory for storage of egress event data,
  initiating by the processor arrangement, a write of a main memory address of the third buffer to a third register of the peripheral component, and
  writing by the processor arrangement, the egress data to the first buffer in response to the egress event data indicating the first buffer is available; and for ingress processing:
  allocating by the processor arrangement, a fourth buffer in the main memory for storage of the ingress event data,
  initiating by the processor arrangement, a write of a main memory address of the fourth buffer to a fourth register of the peripheral component, and
  wherein the polling for ingress event data includes polling the fourth buffer for the ingress event data.

* * * * *

UNITED STATES PATENT AND TRADEMARK OFFICE
CERTIFICATE OF CORRECTION

| | | |
|---|---|---|
| PATENT NO. | : 11,537,542 B1 | Page 1 of 1 |
| APPLICATION NO. | : 17/159672 | |
| DATED | : December 27, 2022 | |
| INVENTOR(S) | : Syam Prasad Tummalacharla et al. | |

It is certified that error appears in the above-identified patent and that said Letters Patent is hereby corrected as shown below:

On the Title Page

Item (12): delete "Prasad et al." and insert --Tummalacharla et al.--

Item (72), Column 1, Inventors: delete "Syam Prasad" and insert --Syam Prasad Tummalacharla--

Signed and Sealed this
Eleventh Day of February, 2025

Coke Morgan Stewart
*Acting Director of the United States Patent and Trademark Office*